United States Patent [19]
Kuroki et al.

[11] Patent Number: 6,115,069
[45] Date of Patent: Sep. 5, 2000

[54] VIDEO CAMERA WITH SWINGABLE ELECTRONIC MONITOR MOUNTED ON THE SAME SIDE OF THE CAMERA AS THE CASSETTE HOLDER

[75] Inventors: Hiroyuki Kuroki, Suita; Takahiro Honbu, Hirakata; Hiromi Amano, Neyagawa; Seiki Morishita, Hirakata, all of Japan

[73] Assignee: Matsushita Electric Industrial Co., Ltd., Japan

[21] Appl. No.: 08/916,573

[22] Filed: Aug. 22, 1997

[30] Foreign Application Priority Data

Aug. 22, 1996 [JP] Japan .................................. 8-220908

[51] Int. Cl.⁷ .................................................. H04N 5/225
[52] U.S. Cl. .......................... 348/375; 348/333; 348/373
[58] Field of Search ..................................... 348/333, 373, 348/375, 376; 358/906, 909.1; 386/38, 118; 396/373, 374, 383; D16/200, 202, 212; 360/93, 96.5

[56] References Cited

U.S. PATENT DOCUMENTS

| | | | |
|---|---|---|---|
| 5,539,463 | 7/1996 | Morikawa et al. | 348/375 |
| 5,592,224 | 1/1997 | Shim | 348/333 |
| 5,659,361 | 8/1997 | Jin | 348/333 |
| 5,742,341 | 4/1998 | Ohishi et al. | 348/373 |

FOREIGN PATENT DOCUMENTS

| | | |
|---|---|---|
| 0581286 | 2/1994 | European Pat. Off. . |
| 0640973 | 3/1995 | European Pat. Off. . |
| 0708557 | 4/1996 | European Pat. Off. . |
| 8-307738 | 11/1996 | Japan . |

OTHER PUBLICATIONS

Patent Abstracts of Japan, vol. 015, No. 464 (E–1137) Nov. 25, 1991.

Patent Abstracts of Japan, vol. 014, No. 073 (E–0887) Feb. 9, 1990.

*Primary Examiner*—Wendy Garber
*Assistant Examiner*—Mitchell White
*Attorney, Agent, or Firm*—Parkhurst & Wendel, L.L.P.

[57] ABSTRACT

A video camera with electronic monitor which prevents interference of an electronic monitor and a cassette holder by restricting the movement of the cassette holder based on the detection of opening and rotating angles of the electronic monitor with respect to a video camera body. The video camera with electronic monitor includes the video camera body, the electronic monitor openably attached to the video camera body in a rotatable fashion while it is opened, a fulcrum for supporting the electronic monitor against the video camera body in an openable and rotatable fashion, the cassette holder disposed on the video camera body close to the electronic monitor which projects from the video camera body, and a controller for restricting the movement of the cassette holder by detecting the opening and rotating angles of the electronic monitor with respect to the video camera body.

7 Claims, 5 Drawing Sheets

VIDEO CAMERA WITH SWINGABLE ELECTRONIC MONITOR MOUNTED ON THE SAME SIDE OF THE CAMERA AS THE CASSETTE HOLDER

FIELD OF THE INVENTION

The present invention relates to the field of video cameras with electronic monitors and, more particularly, to video cameras with an openable and rotatable electronic monitor attached to the main body of the video camera.

BACKGROUND OF THE INVENTION

An increasing proportion of video cameras are now equipped with an electronic monitor whose display direction can be changed as required. In addition, market demands are intensifying for smaller video cameras with more varied designs.

Configuration of a video camera with electronic monitor of the prior art is explained with reference to perspectives of FIGS. 6 and 7. An electronic monitor 101 displays video images during recording and playback, and is attached to a video camera body 103 in an openable and rotatable fashion by a fulcrum 102. A cassette holder 104, into which a tape cassette (not illustrated) is inserted, is provided on the video camera body 103 at the opposite side of the electronic monitor 101. A grip belt 105 is provided on the video camera body 103 also at the same side as the cassette holder 104, for the user to insert the hand during operation.

A video camera with electronic monitor of the prior art as configured above is explained below.

The electronic monitor 101 is attached to the video camera body 103 by the fulcrum 102, and is openable in such a way that one side of the electronic monitor 101 separates from a compartment in the video camera body 103. The electronic monitor 101 is also rotatable in a direction perpendicular to the opening axis (not illustrated). Since the cassette holder 104 is disposed on the opposite side of the electronic monitor 101, the cassette holder 104 is unable to interfere with the movement of the electronic monitor 101.

However, in the above conventional configuration of a video camera, the cassette holder 104 is curved to fit to a curved surface of the palm of the hand since the cassette holder 104 is disposed at an area where the user places a hand to hold the video camera body 103. This will broaden the width of the video camera, resulting in a larger video camera set. Moreover, a curved cassette holder 104 may require to be opened for inserting and ejecting a cassette. This prevents disposing other electronic circuits and mechanical components thereon, resulting in inefficient use of space. Furthermore, the cassette holder 104 and the grip belt 105 are disposed on the same side of the video camera body 103. In particular, in the configuration shown in FIG. 7, a grip belt 105 protrudes sideways beyond the cassette holder 104, and therefore interferes with inserting or ejecting a tape cassette from the cassette holder 104 while the user is operating the video camera with the hand inserted into the grip belt 105. This degrades the usability of a conventionally designed video camera with electronic monitor. If the electronic monitor 101 and the cassette holder 104 are provided on the same side to avoid this interference, the electronic monitor 101 and the cassette holder 104 may have to be disposed at a considerable distance from each other to prevent mutual interference, thus requiring a larger size for the entire video camera with electronic monitor.

SUMMARY OF THE INVENTION

The present invention offers a video camera with electronic monitor which prevents interference between an electronic monitor and a cassette holder without enlarging the size of the entire video camera.

The video camera with electronic monitor of the present invention comprises a video camera body, an electronic monitor openably attached to the video camera body in a rotatable fashion while it is opened, a fulcrum for supporting opening and rotating movement of the electronic monitor against the video camera body, and a controller for restricting the movement of the cassette holder by detecting opening and rotating angles of the electronic monitor against the video camera body. With this configuration, the present invention provides a small video camera with electronic monitor which prevents mutual interference of the electronic monitor and the cassette holder.

BRIEF DESCRIPTION OF THE DRAWINGS

These and other aspects will become more apparent and better understood from the Description of the Preferred Embodiments considered in conjunction with the accompanying drawings in which.

DESCRIPTION OF THE PREFERRED EMBODIMENTS

An exemplary embodiment of the present invention is explained below with reference to FIGS. 1 to 5.

Figure 1:
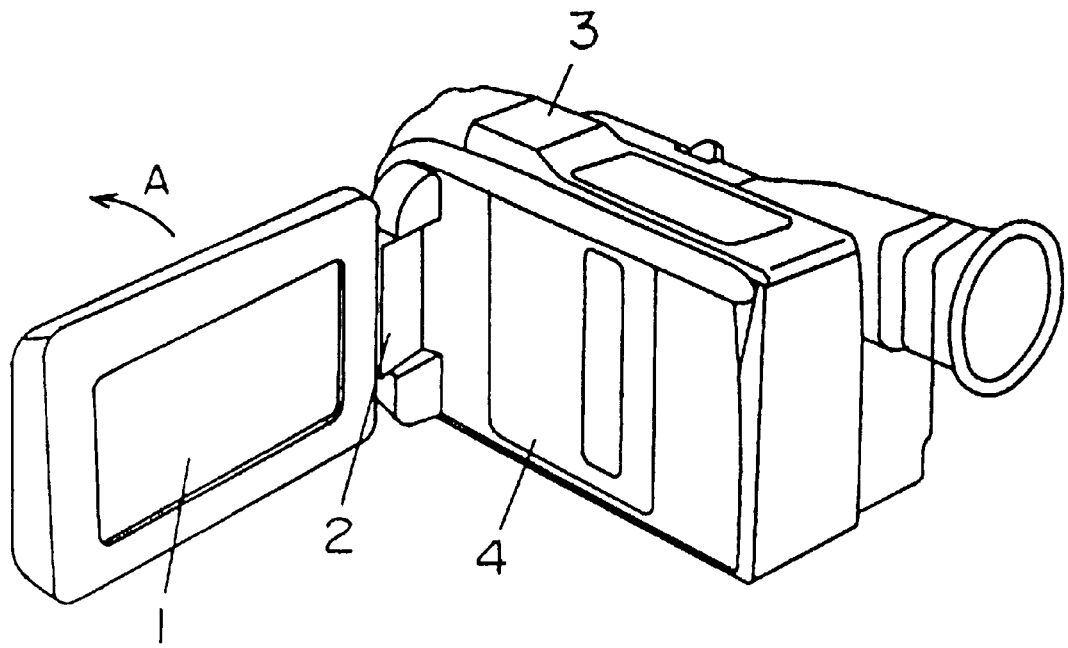
FIG. 1 is a perspective view seen from the left back of a video camera with electronic monitor in accordance with an exemplary embodiment of the present invention.
Figure 2:
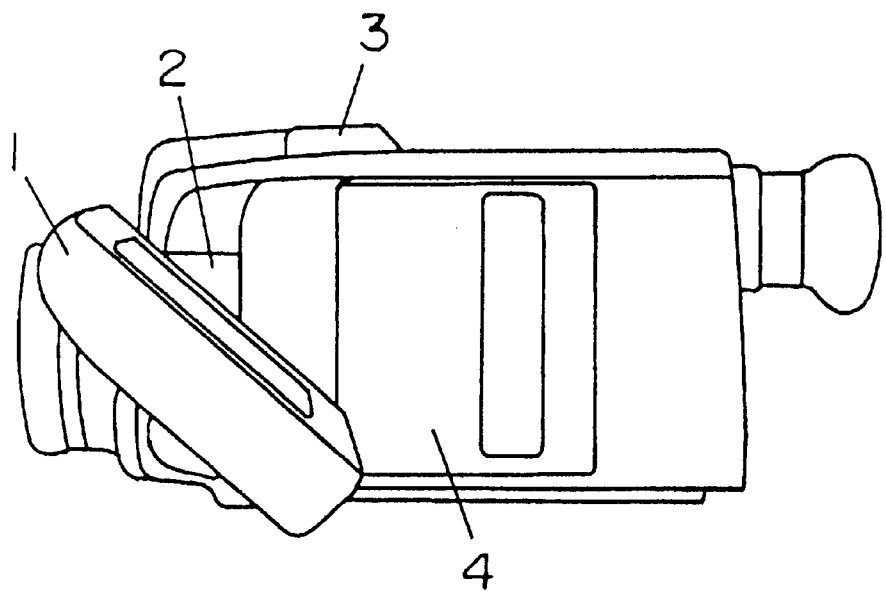
FIG. 2 is a left side view of a video camera with electronic monitor in accordance with the exemplary embodiment of the present invention.
Figure 3:
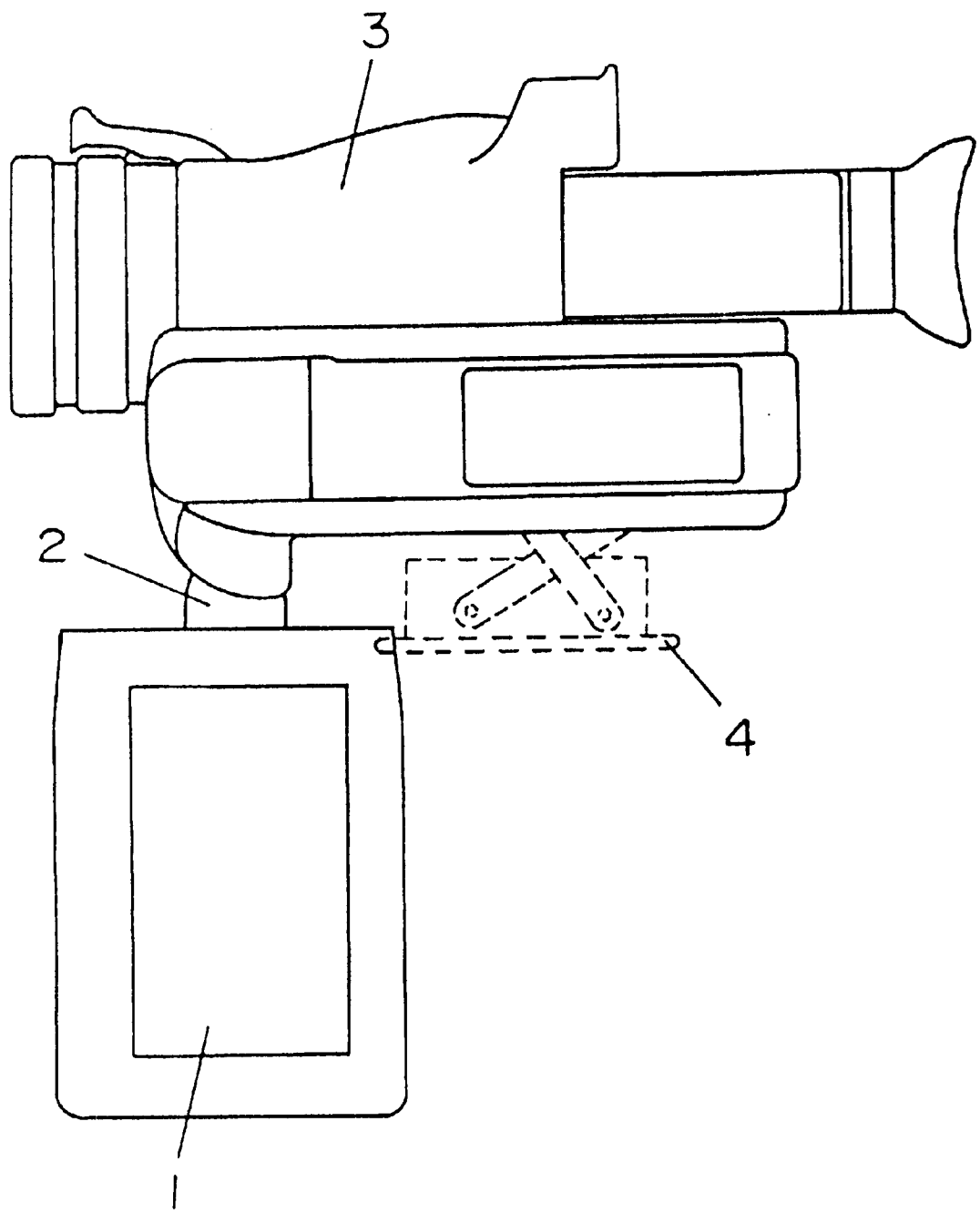
FIG. 3 is a top view of a video camera with electronic monitor in accordance with the exemplary embodiment of the present invention.

As shown in FIGS. 1 to 3, an electronic monitor 1 which displays video images during recording and playback is attached to a video camera body 3 in an openable and rotatable fashion by a pivot joint or fulcrum 2. A cassette holder 4, into which a tape cassette (not illustrated) can be inserted, is disposed on the video camera body 3 on the same side as the electronic monitor 1 in such a way as to allow the cassette holder 4 to move in and out as indicated by the dotted line in FIG. 3. When the electronic monitor 1 and the cassette holder 4 are in a closed position, the electronic monitor 1 is closed in such a way as to cover the cassette holder 4.

Details of the fulcrum 2 are explained with reference to FIGS. 4 and 5.

An opening axis 11 is provided on the video camera body 3, and the electronic monitor 1 is supported against the video camera body 3 in such a way as to allow the electronic monitor 1 to be opened and closed around the opening axis 11.

A rotation axis 10 is mounted on the electronic monitor 1, and the opening axis 11 supports the electronic monitor 1 in such a way as to allow the electronic monitor 1 to be rotated around the rotation axis 10. In other words, the electronic monitor 1 is, from its closed position, openable around the opening axis 11, and rotatable around the rotation axis 10.

A rotation cam 5 comprises an electronic monitor image inverting switch cam face 5a and a cassette holder movement restricting switch cam face 5b, and is disposed at an end of the rotation axis 10 mounted on the electronic monitor 1.

An electronic monitor image inverting switch 7 is mounted on the opening axis 11, and outputs an ON or OFF signal depending on its relative position to the electronic monitor image inverting switch cam face 5a to invert the image displayed on the electronic monitor 1 upside down when the electronic monitor 1 is rotated farther than a specified angle. In the exemplary embodiment, the image is inverted when the electronic monitor 1 is rotated beyond a horizontal line (about 90° from the condition illustrated in FIG. 1).

A cassette holder movement restricting switch 8 is mounted on the opening axis 11, and outputs an ON signal based on the relative position to the cassette holder movement restricting switch cam face 5b to restrict the movement of the cassette holder 4 when the electronic monitor 1 is in a position to interfere with the cassette holder 4 as it opens. In accordance with this ON signal, opening of the cassette holder 4 can be blocked.

An electronic monitor lighting switch 9 is mounted on the opening axis 11, and an opening cam 6 is disposed on the video camera body 3. The electronic monitor lighting switch 9 turns on depending on its relative position to the opening cam 6 when the electronic monitor 1 is opened to a specified angle against the video camera body 3, and outputs a control signal for turning on the electronic monitor 1.

The movement of a video camera with electronic monitor of the exemplary embodiment as configured above is explained below.

The video camera with electronic monitor of the present invention permits the electronic monitor 1 to be opened perpendicular to the video camera body 3, as shown in FIG. 1, to ensure the cassette holder 4 can move out without interfering with the electronic monitor 1 as indicated by the dotted line in FIG. 3. When the electronic monitor 1 is opened in a tilted direction as shown in FIGS. 2 and 3, the cassette holder 4 when opened contacts the electronic monitor 1. This occurs because the cassette holder 4 is disposed near the fulcrum 2 to shorten the total length of the video camera body 3 to enable reduction of the overall size of the video camera with electronic monitor.

Figure 4:
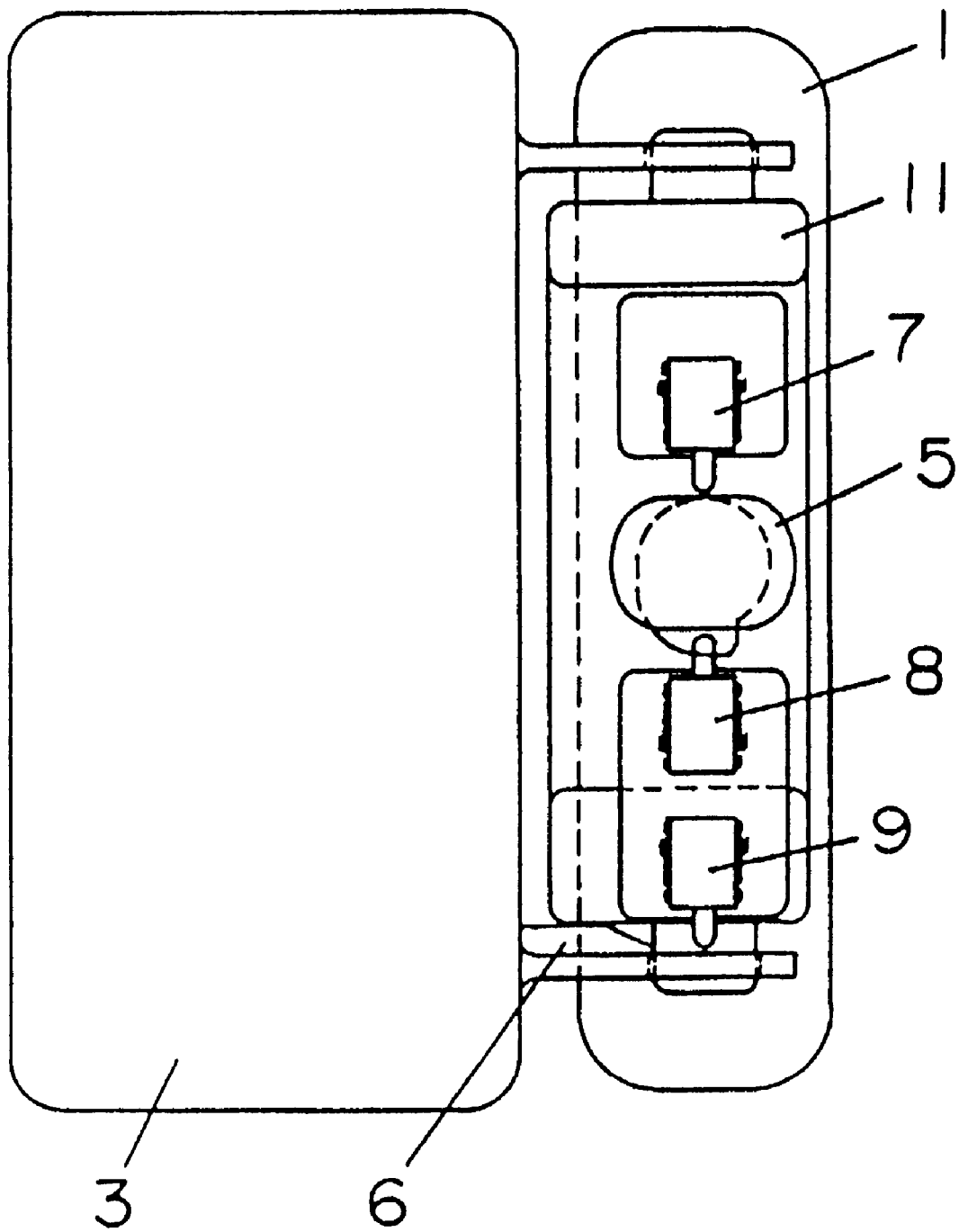
FIG. 4 is a front view of a fulcrum of a video camera with electronic monitor in accordance with the exemplary embodiment of the present invention.
Figure 5:
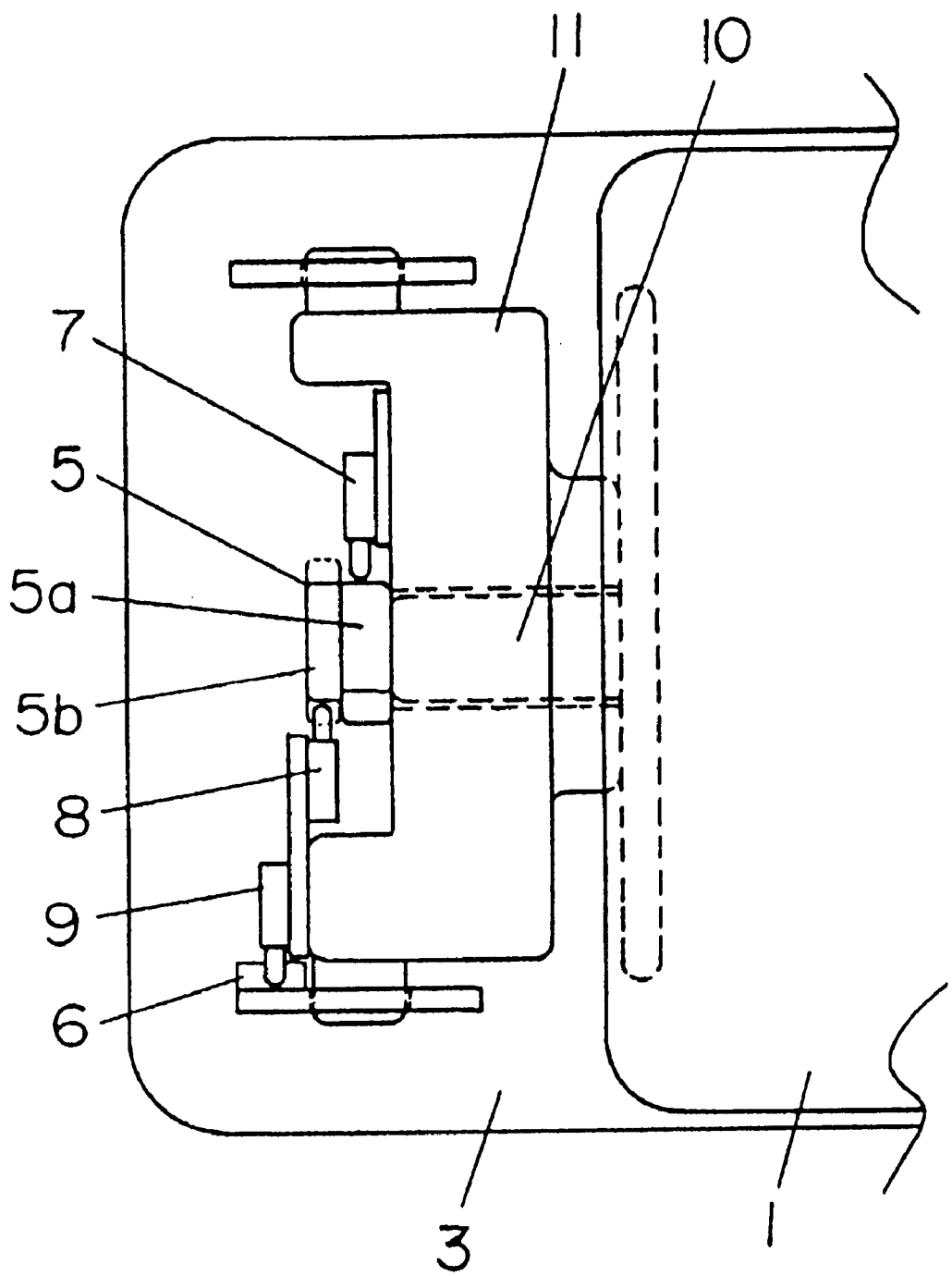
FIG. 5 is a left side view of a fulcrum of a video camera with electronic monitor in accordance with the exemplary embodiment of the present invention.
Figure 6:
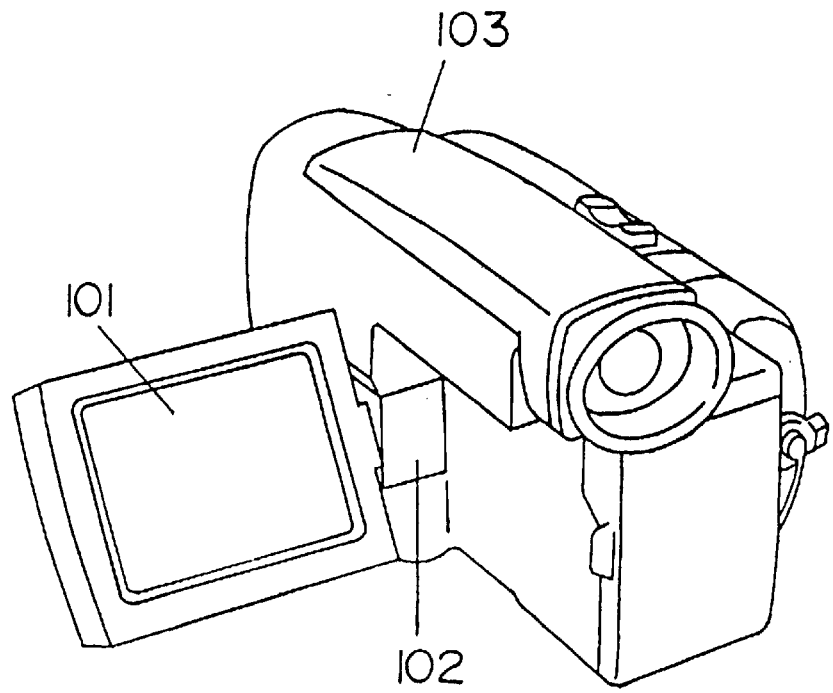
FIG. 6 is a perspective view seen from the left back of a video camera with electronic monitor in accordance with the prior art.
Figure 7:
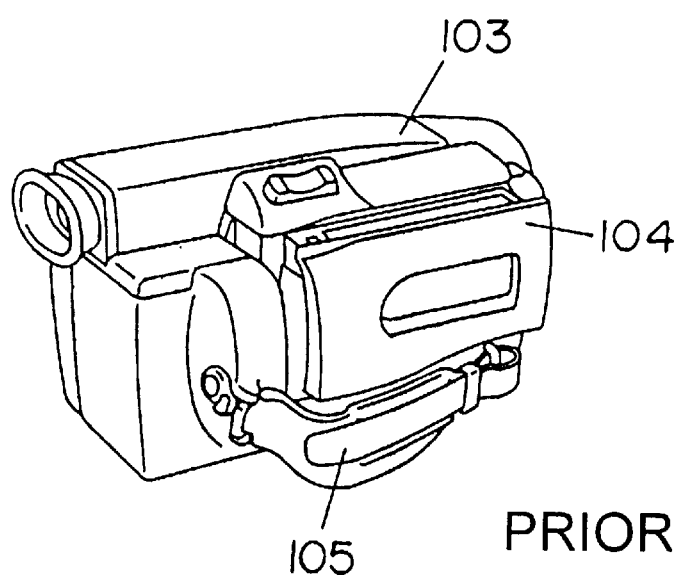
FIG. 7 is a perspective view seen from the right back of a video camera with electronic monitor in accordance with the prior art.

As shown in FIGS. 4 and 5, the electronic monitor lighting switch 9, cassette holder movement restricting switch 8, and electronic monitor image inverting switch 7 are disposed in the fulcrum 2 as a means for detecting the opening and rotating angles of the electronic monitor 1 against the video camera body 3. When rotating the electronic monitor 1 around the opening axis 11 from its closed position on the video camera body 3, the opening cam 6 turns on the electronic monitor lighting switch 9 when the electronic monitor 1 opens to an angle which does not interfere with the cassette holder 4 as shown in FIG. 1, and the electronic monitor 1 becomes displayable.

When the electronic monitor 1 is further opened to its maximum angle, which is a stop position, and then rotated around the rotation axis 10 to an angle which interferes with the cassette holder 4 as shown in FIG. 2, the rotation cam 5 turns on the cassette holder movement restricting switch 8.

The cassette holder 4 is movable only when the cassette holder movement restricting switch 8 is OFF and the electronic monitor lighting switch 9 is ON. In other ON and OFF combinations of the cassette holder movement restricting switch 8 and the electronic monitor lighting switch 9, the cassette holder 4 is restricted in movement so as to prevent interference of the electronic monitor 1 with the cassette holder 4.

When the electronic monitor 1 rotates around the rotation axis 10 to 90° from the position illustrated in FIG. 1 to a direction indicated by the arrow A, the rotation cam 5 turns on the electronic monitor image inverting switch 7 to invert the image displayed upside down on the electronic monitor 1. Accordingly, the person who is being recorded can confirm the recorded image by turning the electronic monitor 1 further in the same direction.

As explained above, the present invention offers a video camera with electronic monitor which compensates for the positional relation between the electronic monitor 1 and the cassette holder 4 by detecting the opening and rotating angles of the electronic monitor 1 against the video camera body 3 and thereby restricting the movement of the cassette holder 4.

Also with the configuration of the present invention, the electronic monitor 1 covers the cassette holder 4 when they are each in a closed position because the cassette holder 4 and the electronic monitor 1 are disposed on the same side of the video camera body. This makes it unnecessary to secure high mechanical strength for the cassette holder 4 because the cassette holder 4 is not exposed to the outside. In addition, since a flat electronic monitor attaches to a flat cassette, there is no wasting of space, and therefore the thickness of the cassette can be decreased. The present invention enables a smaller video camera set by also narrowing the width of the video camera with consideration to the position of the grip.

In the exemplary embodiment, the movement of the cassette holder 4 is controlled by the above-mentioned ON and OFF combinations. This invention may be put into practice or embodied in still other ways. For instance, the movement of the cassette holder 4 can be controlled by a successive detector such as a rotating angle sensor instead of ON and OFF detection.

An error message such as "set the monitor upright" on the electronic monitor 1 can also be displayed when the cassette holder movement control switch 8 is turned ON, to announce that the cassette holder 4 is not operable.

The preferred embodiments described herein are therefore illustrative and not restrictive, the scope of the invention being indicated by the appended claims and all variations which come within the meaning of the claims are intended to be embraced therein.

What is claimed is:

1. A video camera with electronic monitor comprising:
   a video camera body;
   an electronic monitor attached to said video camera body by a pivot joint so that the monitor is wingable about an axis outwardly from the camera body into an open variable position and is rotatable about another axis to facilitate viewing of said monitor;
   a cassette holder connected to said video camera body near the electronic monitor, said cassette holder being extendable from said camera body to facilitate insertion and removal of a video film cassette; and control means for (i) detecting the open position and rotation position of the electronic monitor with respect to the video camera body and (ii) restricting movement of the cassette holder responsive to said open and rotation positions.

2. A video camera with electronic monitor as defined in claim 1, wherein said control means comprises (i) means for detecting an opening angle of said electronic monitor with respect to said video camera body and (ii) means for detecting a rotating angle of said electronic monitor with respect to said video camera body, and wherein the movement of said cassette holder is restricted when signals output from said means for detecting an opening angle and means for detecting a rotating angle indicate that said electronic monitor is in an open and rotated position which interferes with the movement of said cassette holder.

3. A video camera with electronic monitor as defined in claim 2, wherein said control means further comprises a second means for detecting a rotating angle of said electronic monitor with respect to said video camera body, and wherein a signal output from said second means for detecting a rotating angle initiates inversion of a video image displayed on said electronic monitor.

4. A video camera with electronic monitor as defined in claim 2, wherein said means for detecting an opening angle of said electronic monitor with respect to said video camera body comprises a pair of an opening cam and an opening switch disposed on said pivot joint, and said means for detecting a rotating angle of said electronic monitor with respect to said video camera comprises at least one pair of a rotating cam and a rotating switch disposed on a rotation axis fixed to said electronic monitor.

5. A video camera with electronic monitor as defined in claim 3, wherein said means for detecting a rotating angle of said electronic monitor with respect to said video camera body comprises two pairs of a rotating cam and a rotating switch mounted on a rotation axis fixed to said electronic monitor, and one pair of said rotating cam and said rotating switch outputs a signal that initiates inversion of a video image displayed on said electronic monitor.

6. A video camera with electronic monitor as defined in claim 1, wherein said control means comprises:

an electronic monitor lighting switch for turning on said electronic monitor when said electronic monitor is moved to a position which does not interfere with the movement of said cassette holder;

a cassette holder movement restricting switch for restricting movement of said cassette holder when said electronic monitor is rotated to a position which interferes with the movement of said cassette holder; and an electronic monitor image inverting switch for initiating inversion of a video image displayed on said electronic monitor when said electronic monitor is rotated beyond a predetermined angle.

7. A video camera with electronic monitor as defined in claim 1, wherein said cassette holder and said electronic monitor are disposed on the same side of the video camera body, said electronic monitor covering said cassette holder when said electronic monitor and said cassette holder are housed.

* * * * *

UNITED STATES PATENT AND TRADEMARK OFFICE
CERTIFICATE OF CORRECTION

PATENT NO. : 6,115,069 Page 1 of 1
DATED : September 5, 2000
INVENTOR(S) : Hiroyuki Kuroki et al It is certified that error appears in the above-identified patent and that said Letters Patent is hereby corrected as shown below:

Column 4,
Line 60, change "wingable" to -- swingable --.

Signed and Sealed this

Fourth Day of December, 2001

Attest:

*Attesting Officer*

NICHOLAS P. GODICI
*Acting Director of the United States Patent and Trademark Office*